(12) United States Patent
Gromfeld

(10) Patent No.: US 10,082,272 B2
(45) Date of Patent: Sep. 25, 2018

(54) BI-FUNCTION LIGHTING MODULE MADE OF TRANSPARENT MATERIAL

(71) Applicant: VALEO VISION, Bobigny (FR)

(72) Inventor: Yves Gromfeld, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/680,297

(22) Filed: Aug. 18, 2017

(65) Prior Publication Data
US 2018/0087745 A1    Mar. 29, 2018

(30) Foreign Application Priority Data
Sep. 26, 2016   (FR) ..................... 16 59001

(51) Int. Cl.
| | |
|---|---|
| *F21V 7/00* | (2006.01) |
| *F21V 13/04* | (2006.01) |
| *F21V 3/00* | (2015.01) |
| *F21V 5/04* | (2006.01) |
| *F21V 7/06* | (2006.01) |
| *G02B 27/30* | (2006.01) |
| *F21S 41/147* | (2018.01) |
| *F21S 41/24* | (2018.01) |
| *F21S 41/32* | (2018.01) |
| *F21S 41/36* | (2018.01) |

(52) U.S. Cl.
CPC ............ *F21V 13/04* (2013.01); *F21S 41/147* (2018.01); *F21S 41/24* (2018.01); *F21S 41/322* (2018.01); *F21S 41/36* (2018.01); *F21V 3/00* (2013.01); *F21V 5/04* (2013.01); *F21V 7/06* (2013.01); *G02B 27/30* (2013.01)

(58) Field of Classification Search
USPC ......................... 362/516, 509, 517
See application file for complete search history.

(56) References Cited

U.S. PATENT DOCUMENTS

| | | |
|---|---|---|
| 2005/0068787 A1 | 3/2005 | Ishida |
| 2006/0239020 A1 | 10/2006 | Albou |
| 2014/0016343 A1 | 1/2014 | Brendle |

FOREIGN PATENT DOCUMENTS

| | | |
|---|---|---|
| DE | 10 2011 013 211 A1 | 9/2012 |
| DE | 10 2014 205 994 A1 | 10/2015 |
| EP | 1 666 787 A1 | 6/2006 |
| EP | 1 715 245 A1 | 10/2006 |
| FR | 2 860 280 A1 | 4/2005 |

OTHER PUBLICATIONS

French Preliminary Search Report dated May 10, 2017 in French Application 16 59001, filed on Sep. 26, 2016 (with English Translation of Categories of cited documents).

*Primary Examiner* — Vip Patel
(74) *Attorney, Agent, or Firm* — Oblon, McClelland, Maier & Neustadt, L.L.P.

(57) ABSTRACT

A lighting module, able to form a light beam along an optical axis, notably for a motor vehicle, having a body made of transparent material. The lighting module includes a first light rays input surface and a first reflection surfaceable to reflect to one or more focuses the light rays coming from the first input surface. A dioptric reflection folder surface essentially is extended along the optical axis and forms a cut-off edge at the level of the focus or focuses. Also included is a second light rays input surface, opposite to the first input surface with respect to the optical axis and a second reflection surface able to reflect the light rays coming from the second input surface towards the cut-off edge.

20 Claims, 2 Drawing Sheets

BI-FUNCTION LIGHTING MODULE MADE OF TRANSPARENT MATERIAL

The invention relates to the field of lighting, notably for motor vehicles.

The published patent document EP 1 715 245 A1 discloses a lighting module forming a lighting beam having a cut-off. The module comprises a body made of transparent material with an input surface, a first reflection surface, a second reflection surface with a cut-off edge and an output surface. The first and second reflection surfaces form diopters with the ambient air and thus allow rays to undergo reflection on them by application of the total reflection principle. This module is advantageous in that is assembles, in the same body, a collimator, a reflector, a folder and a lens, and thus provides a lighting function with a cut-off. This module however allows only a single lighting function, in this instance a lighting with a cut-off function.

The purpose of the invention is to overcome at least one of the disadvantages of the abovementioned prior art. More particularly, the purpose of the invention is to propose a lighting module comprising a body made of transparent or translucent material and which is able to provide several lighting functions.

The invention relates to a lighting module for a motor vehicle, the module being able to form a light beam along an optical axis, and comprising a body made of transparent or translucent material, the said body comprising a first light rays input surface; a first reflection surface able to reflect to one or more focuses the light rays coming from the first input surface; a dioptric reflection folder surface essentially extending along the optical axis and forming a cut-off edge at the level of the focus or focuses and a light rays output surface; noteworthy in that the body furthermore comprises a second light rays input surface, opposite to the first input surface with respect to the optical axis, and a second reflection surface able to reflect the light rays coming from the second input surface towards the cut-off edge, the body forming a cavity with a bottom formed by the dioptric reflection surface, the said cavity being able to be traversed by the rays coming from the second reflection surface.

The optical axis advantageously passes into the folder surface.

According to an advantageous embodiment of the invention, the cavity is located, with respect to the optical axis, on the same side as the second input surface and the second reflection surface.

According to an advantageous embodiment of the invention, the cavity has a U-shaped cross-section in a longitudinal plane passing through the optical axis.

According to an advantageous embodiment of the invention, the cavity comprises, in addition to the bottom surface, a front surface and a rear surface, the said front surface being adjacent to the bottom surface at the level of the cut-off edge.

According to an advantageous embodiment of the invention, the module is configured such that the light rays coming from the second reflection surface are able to pass through the rear and front surfaces, the said surfaces forming diopters. The diopters are formed with the ambient air.

According to an advantageous embodiment of the invention, the said module extends transversely with respect to the optical axis, preferably following a curved profile.

According to an advantageous embodiment of the invention, the second input surface and the second reflection surface extend transversely with respect to the optical axis over only a portion of the first input surface and of the first reflection surface, the said portion preferably being between 20% and 80%.

According to an advantageous embodiment of the invention, the focus or focuses extend or are distributed transversely with respect to the optical axis along the cut-off edge.

According to an advantageous embodiment of the invention, the cavity is open towards the exterior and contains a material having a refractive index less than that of the transparent or translucent material, such as for example the ambient air.

According to an advantageous embodiment of the invention, the first reflection surface and/or the second reflection surface has a parabolic profile. The parabolic profile of the second reflection surface can comprise a focus or several focuses corresponding to the focus or focuses of the first reflection surface, respectively.

According to an advantageous embodiment of the invention, the first input surface and/or the second input surface comprises at least one optical collimating element, preferably one or more collimators.

According to an advantageous embodiment of the invention, the collimator or each of the collimators of the first input surface and/or of the second input surface has a collimation axis, the said axis or each of the said axes being inclined with respect to a plane perpendicular to the optical axis.

According to an advantageous embodiment of the invention, the inclination of the collimation axis or each of the collimation axes is between 5° and 40°, preferably between 7° and 30°, more preferably between 8° and 15°.

According to an advantageous embodiment of the invention, the first input surface, the first reflection surface, the dioptric reflection surface and the output surface are configured in order to form a beam with a horizontal cut-off of the low beam type, and the second input surface, the second reflection surface and the output surface are configured for forming, in combination with the beam having a horizontal cut-off of the low beam type, a high beam.

According to an advantageous embodiment of the invention, the module comprises moreover a projection lens disposed at the front, according to the direction of propagation of the rays, of the output surface of the body.

The provisions of the invention are advantageous in that they make it possible to produce a double lighting function with a single module. Moreover, the module comprises a body made of transparent or translucent material, preferably in one piece, forming the input surfaces, the reflection surfaces and the output surface. The reflection surfaces are advantageously dioptric, that is to say providing the reflection of the light rays by the principle of total reflection. Thus is notably the case for the folder surface. Such reflection surfaces have a double advantage, namely that they do not require the application of a reflective coating and that they have better optical efficiency.

Other features and advantages of the present invention will be better understood with the help of the description and of the drawings among which:

Figure 1:
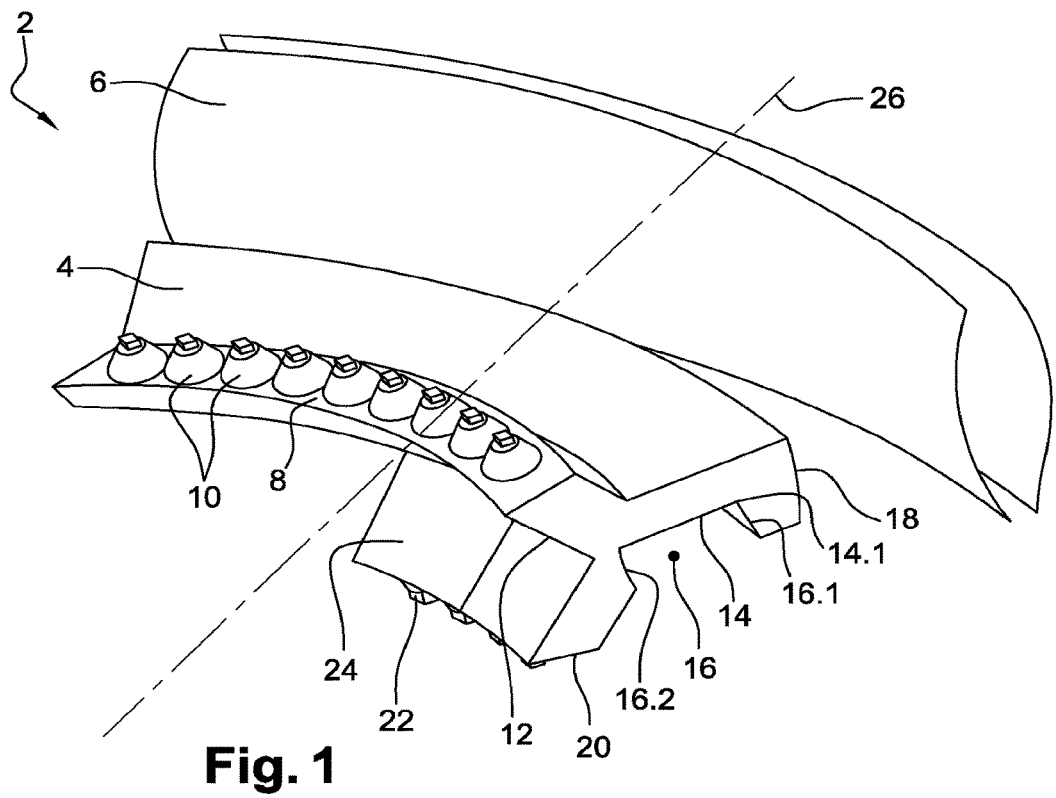
FIG. 1 is a first representation in perspective of a module according to the invention.
Figure 2:
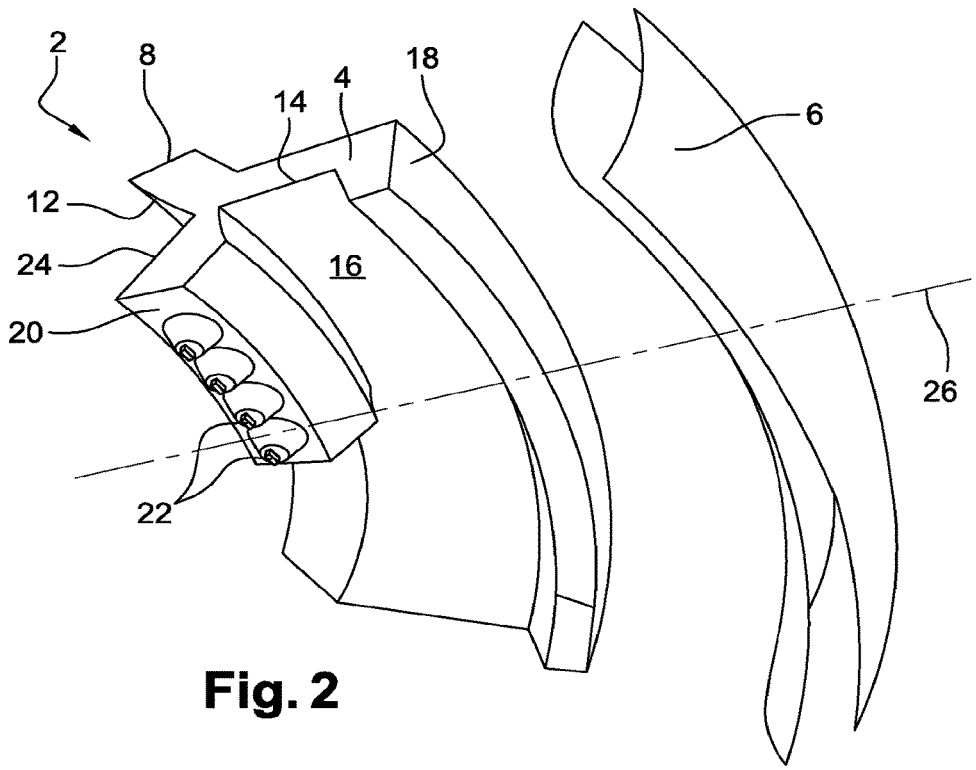
FIG. 2 is a second representation in perspective of the module shown in FIG. 1.

FIGS. 1 and 2 illustrate in perspective a lighting module according to the invention. The module 2 essentially comprises a body 4 made of transparent or translucent material and a projection lens 6. The latter is represented diagrammatically by its input and output surfaces. Moreover, it is not obligatory. The body 4 can be made of plastic, such as poly(methyl methacrylate) (PMMA), or of glass.

The body 4 comprises a first input surface 8 for light rays emitted by one or more light sources (not shown). The input surface 8 can comprise one or more collimators 10 facing which the light sources (not shown) are disposed. The body 4 also comprises a first reflection surface 12 for rays coming from the input surface 8, the said surface reflecting the said rays towards a folder 14. The latter is formed by a surface 14 of the body 4. Plus precisely, the body 4 forms a cavity 16 whose bottom corresponds to the folder surface 14 in question. The cavity 16 is open towards the exterior and is advantageously empty of solid matter, that is to say it is filled with the ambient air. In other embodiments, the cavity can be filled with a material other than air, whose refractive index is less than that of the transparent or translucent material of the body 4. The folder surface 14 thus forms a diopter between the transparent or translucent material of the body 4 and the air in the cavity 16, the refractive index of the said transparent or translucent material being greater than that of the air. The folder surface 14 is thus able to reflect, by the principle of total reflection, the light rays coming from the first reflection surface 12 and encountering this surface. The first reflection surface 12 is configured for reflecting the major part of the light rays towards the front edge 14.1 of the folder surface 14. The first reflection surface 12 advantageously has a parabolic profile with a focus located on the cut-off edge 14.1. The body 4 also comprises an output surface 18 for the light rays for the purpose of forming a lighting beam. The output surface 18 can be joined to the projection lens 6.

The body also comprises a second input surface 20 advantageously provided with one or more collimators 22, in a way similar to that of the first input surface 8. The second input surface 20 is opposite the first input surface 8 with respect to the optical axis 26 of the module. The body 4 also comprises a second reflection surface 24, also opposite the first reflection surface 12 with respect to the optical axis 26. The profiles of the first and second input and reflection surfaces can advantageously be at least essentially symmetrical with respect to the optical axis 26. Unlike the rays propagating from the first reflection surface 12 to the folder surface 14 through a continuity of transparent material, the rays coming from the second reflection surface 24 and propagating to the cut-off edge 14.1 leave the body 4 through the rear surface 16.2 (in the normal direction of propagation of the rays) of the groove 16, and then propagate inside the said groove 16, and then enter again into the body 4 through the front surface 16.1 (in the normal direction of propagation of the rays) of the said groove 16. The beam thus produced does not have a cut-off considering that the surface face 14 does not reflect the rays propagating in the groove towards the said face but refracts them. This difference is due to the fact that the refractive index of the ambient air in the groove in which the incident ray propagates is less than the refractive index of the transparent or translucent material of the body 4.

The path of the rays from the first and second input surfaces will be described in more detail with reference to FIGS. 3 and 4.

It can be seen in FIGS. 1 and 2 that the module 2, in this instance the body 2 and the projection lens 6 extend transversely with respect to the optical axis 26, in this instance according to an arc of circle. It can also be seen that the second input 20 and reflection 24 surfaces can extend, transversely, only over a portion of the first input 8 and reflection 12 surfaces. This portion can be between 20% and 80%. It is however also possible for the extents of the first and second input and reflection surfaces to be essentially identical.

Figure 3:
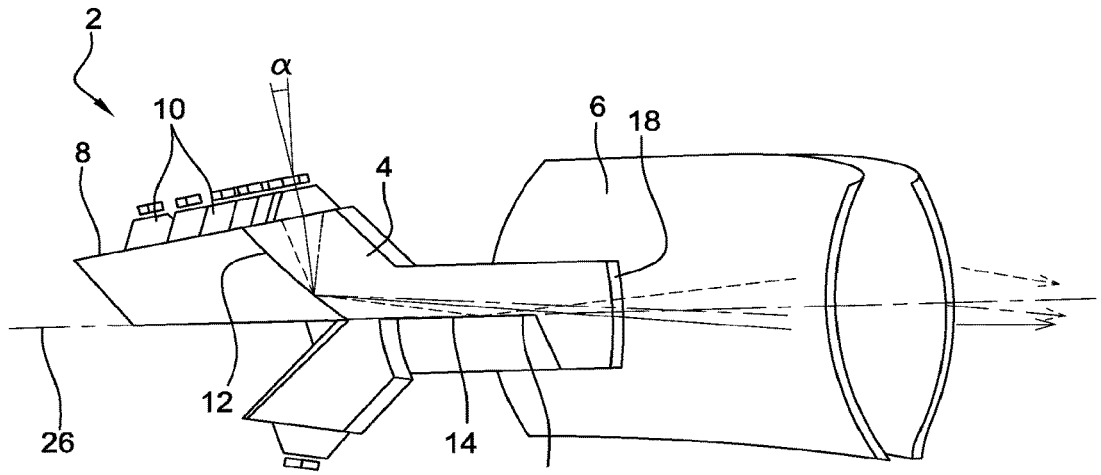
FIG. 3 is a side view of the module shown in FIGS. 1 and 2, illustrating the path of light rays according to a first lighting function.

FIG. 3 is a side view of the module shown in FIGS. 1 and 2, illustrating the path of three types of rays emitted by the light sources disposed facing the first input surface 8.

A first ray, shown in continuous line, is reflected by the first reflection surface 12 towards the cut-off edge 14.1 in such a way as to pass in font to this edge and not to undergo any reflection there. This ray leaves the body 4 through the output surface 18 and passes through the projection lens 6 and then propagates essentially parallel with the optical axis 26.

A second ray, shown in dashed line, encounters the first reflection surface 12 at an angle of incidence larger than that of the first ray. It is then reflected towards the folder surface 14 and there undergoes a reflection towards the top part of the body 4 and of the projection lens 6. This ray leaves the projection lens 6 with a direction slightly downward inclined with respect to the optical axis 26.

A third ray, shown in axis type line (dash-dot-dash), encounters the first reflection surface 12 at an angle incidence smaller than that of the first ray. Thus ray passes in front of the cut-off edge 14.1, at a distance from that edge, and leaves the projection lens 6 with a slightly downward inclined direction with respect to the optical axis 26.

In the light of the above, the folder surface 14, with the cut-off edge 14.1, ensures a good cut-off, in this instance horizontal, of the light beam produced. The functional principle of a folder is itself well known to those skilled in the art. In the present case, the folder has the feature of being formed by the diopter formed by the surface 14. This signifies that this surface can remain transparent and does not require the application of a reflective layer, the reflection taking place according to the principle of total reflection.

Still with reference to FIG. 3, the axis of collimation of the collimator or collimators 10 can be inclined towards the rear (with respect to the direction of travel of the rays) by an angle α with a plane perpendicular to the optical axis 26. The angle α can be between 5° and 40°, preferably between 5° and 30°, more preferably between 7° and 30° and even more preferably between 8° and 15°. Such an inclination makes it possible to increase the optical efficiency.

Figure 4:
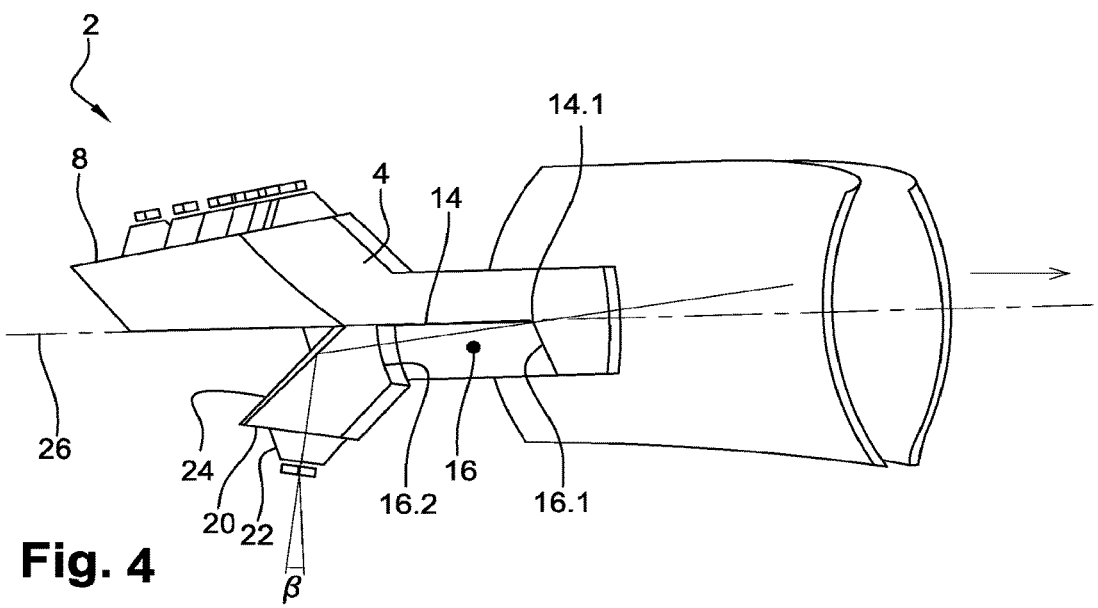
FIG. 4 is side view of the module shown in FIGS. 1 and 2, illustrating the path of light rays according to a second lighting function.

FIG. 4 is a side view of the module shown in FIGS. 1 and 2, illustrating the path of a light ray emitted by the light sources disposed facing the second input surface 20.

The emitted ray coming from the input surface 20 is reflected by the second reflecting surface 24 towards the rear surface 16.2 (with respect to the direction of travel of the rays) of the groove 16 and then leaves the body 4 and passes at least partially through the groove 16. The ray then enters the body again through the front face 16.1 (with respect to the direction of travel of the rays) of the groove 16 in order to pass at the level of or at least close to the cut-off edge 14.1 of the folder surface 14. The second reflecting surface 24 is advantageously configured for converging the rays towards the cut-off edge 14.1. The rays leave essentially from the upper part of the projection lens in the direction of the optical axis 26 and thus form a beam illuminating mostly above the optical axis in question. This beam can be added to the cut-off beam produced by the light sources of the first input surface 8 (FIG. 3) for the purpose of forming a so-called high beam or main beam.

Still with reference to FIG. 4, the axis of collimation of the collimator or collimators 22 can be inclined towards the rear (with respect to the direction of travel of the rays) by an angle β with the plane perpendicular to the optical axis 26. The angle β can be between 5° and 40°, preferably between 5° and 30°, more preferably between 7° and 30° and even more preferably between 8° and 15°. Such an inclination makes it possible to increase the optical efficiency.

Figure 5:
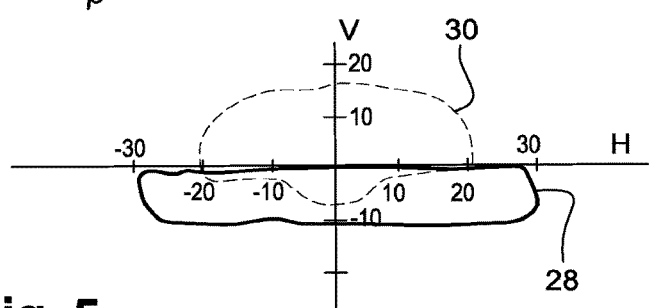
FIG. 5 shows the light images of the first and second lighting functions shown in FIGS. 3 and 4.

FIG. 5 is a diagrammatic illustration of the light images produced by the beams described with reference to FIGS. 3 and 4. The axis H corresponds to the horizontal passing through the optical axis of the module. The axis V corresponds to the vertical and passes through the optical axis of the module. The FIGS. 10, 20, 30) on the axes H and V represent the amounts of deflection in degrees with respect to the optical axis. It can be seen that the light image 28 produced by the cut-off beam, described in detail with reference to FIG. 3, provides illumination essentially below the horizontal axis whereas the light image 30 produced by the beam described in detail with reference to FIG. 4 provides illumination mostly above the horizontal axis. The superimposition of the light images 28 and 30 can correspond to so called high beam or main beam lighting.

It should be noted that the light images which have just been commented upon with reference to FIG. 5 can be shifted horizontally, that is to say along the H axis, notably when several, preferably two, lighting modules are configured for cooperating in producing a combined lighting beam, in which case it can be desirable for one of the modules to illuminate more on one side (laterally) and for the other one of the said modules to illuminate more on the opposite side.

The invention claimed is:

1. Lighting module for a motor vehicle, the module being able to form a light beam along an optical axis, and comprising a body made of transparent or translucent material, the said body comprising:
a first light rays input surface;
a first reflection surface able to reflect to one or more focuses the light rays coming from the first input surface;
a dioptric reflection folder surface essentially extending along the optical axis and forming a cut-off edge at the level of the focus or focuses;
a light rays output surface;
characterized in that the body furthermore comprises:
a second light rays input surface, opposite to the first input surface with respect to the optical axis, and
a second reflection surface able to reflect the light rays coming from the second input surface towards the cut-off edge,
the body forming a cavity with a bottom formed by the folder surface, the said cavity being able to be traversed by the rays coming from the second reflection surface.

2. Module according to claim 1, wherein the cavity is located, with respect to the optical axis, on the same side as the second input surface and the second reflection surface.

3. Module according to claim 1, wherein the cavity has a U-shaped cross-section in a longitudinal plane passing through the optical axis.

4. Module according to claim 1, wherein the cavity comprises, in addition to the bottom surface, a front surface and a rear surface, the said front surface being adjacent to the bottom surface at the level of the cut-off edge.

5. Module according to claim 4, wherein the said module is configured such that the light rays coming from the second reflection surface are able to pass through the rear and front surfaces of the cavity, the said surfaces forming diopters.

6. Module according to claim 1, wherein the said module extends transversely with respect to the optical axis, preferably following a curved profile.

7. Module according to claim 6, wherein the second input surface and the second reflection surface extend transversely with respect to the optical axis over only a portion of the first input surface and of the first reflection surface, the said portion preferably being between 20% and 80%.

8. Module according to claim 6, wherein the focus or focuses extend transversely with respect to the optical axis along the cut-off edge.

9. Module according to claim 1, wherein the cavity is open towards the exterior and contains a material having a refractive index less than that of the transparent or translucent material.

10. Module according to claim 1, wherein the first reflection surface and/or the second reflection surface has a parabolic profile.

11. Module according to claim 1, wherein the first input surface and/or the second input surface comprises at least one optical collimating element, preferably one or more collimators.

12. Module according to claim 11, wherein the collimator or each of the collimators of the first input surface and/or of the second input surface has a collimation axis, the said axis or each of the said axes being inclined with respect to a plane perpendicular to the optical axis.

13. Module according to claim 12, wherein inclination of the collimation axis or each of the collimation axes is between 5° and 40°, preferably between 7° and 30°, more preferably between 8° and 15°.

14. Module according to claim 1, wherein the first input surface, the first reflection surface, the folder surface and the output surface are configured in order to form a beam with a horizontal cut-off of the low beam type, and the second input surface, the second reflection surface and the output surface are configured for forming, in combination with the beam having a horizontal cut-off of the low beam type, a high beam.

15. Module according to claim 1, that it wherein the module comprises moreover a projection lens disposed at the front, according to the direction of propagation of the rays, of the output surface of the body.

16. Module according to claim 2, wherein the cavity has a U-shaped cross-section in a longitudinal plane passing through the optical axis.

17. Module according to claim 2, wherein the cavity comprises, in addition to the bottom surface, a front surface and a rear surface, the said front surface being adjacent to the bottom surface at the level of the cut-off edge.

18. Module according to claim 2, wherein the said module extends transversely with respect to the optical axis, preferably following a curved profile.

19. Module according to claim 2, wherein the focus or focuses extend transversely with respect to the optical axis along the cut-off edge.

20. Module according to claim 7, wherein the focus or focuses extend transversely with respect to the optical axis along the cut-off edge.

\* \* \* \* \*